(12) United States Patent
Shustack

(10) Patent No.: US 6,818,680 B2
(45) Date of Patent: Nov. 16, 2004

(54) CURABLE ADHESIVE COMPOSITIONS

(75) Inventor: Paul J. Shustack, Elmira, NY (US)

(73) Assignee: Corning Incorporated, Corning, NY (US)

( * ) Notice: Subject to any disclaimer, the term of this patent is extended or adjusted under 35 U.S.C. 154(b) by 114 days.

(21) Appl. No.: 10/253,623

(22) Filed: Sep. 23, 2002

(65) Prior Publication Data

US 2004/0072933 A1 Apr. 15, 2004

(51) Int. Cl.$^7$ .................................................. C08F 2/46

(52) U.S. Cl. ........................ 522/134; 522/150; 522/152; 522/162; 522/164; 522/173; 522/176; 522/180; 522/182; 428/355 R; 428/355 CN; 428/355 N; 428/355 EP; 427/207.1; 427/162; 427/164; 427/165

(58) Field of Search ................................ 522/134, 150, 522/152, 162, 164, 167, 173, 176, 180, 182; 428/355 R, 355 CN, 355 N, 355 EP; 427/207.1, 162, 164, 165

(56) References Cited

U.S. PATENT DOCUMENTS

| | | | |
|---|---|---|---|
| 4,497,890 A | 2/1985 | Helbert | 430/296 |
| 5,064,495 A | 11/1991 | Omura et al. | 156/307.3 |
| 5,085,726 A | 2/1992 | Omura et al. | 156/307.3 |
| 5,725,948 A * | 3/1998 | Oka et al. | 428/355 |
| 5,795,407 A | 8/1998 | Ishii et al. | 148/253 |
| 5,879,757 A | 3/1999 | Gutowski et al. | 427/491 |
| 6,034,194 A | 3/2000 | Dershem et al. | 526/262 |
| 6,133,338 A | 10/2000 | Kimura et al. | 523/116 |

FOREIGN PATENT DOCUMENTS

| | | |
|---|---|---|
| EP | 0969062 A2 | 7/1999 |
| EP | 0969028 A2 | 1/2000 |
| EP | 0969058 A2 | 1/2000 |
| EP | 0969059 A2 | 1/2000 |
| EP | 0969063 A2 | 1/2000 |
| GB | 2289472 A | 11/1995 |
| JP | 57-108158 | 7/1982 |
| JP | 58016232 * | 1/1983 |
| JP | 03-031309 | 2/1991 |
| JP | 10-182779 | 7/1998 |
| JP | 2000-144089 | 5/2000 |
| WO | 99/36484 * | 7/1999 |

OTHER PUBLICATIONS

"New UV–Curable Adhesives with Variable Refractive Index Based on Inorganic–Organic Nanocomposites (NANOMER®) For Otpical Components" R.P. Winkler, et al, 9$^{th}$ Cimtec Worlds Ceramics Congress, pp. 689–696.

"UV–Curable Epoxy Based Nanocomposite Adhesive For Applications in Integrated Optics" T. Koch, et al, 9$^{th}$ Cimtec Worlds Ceramics Congress, pp. 681–388.

"Self–Assembled Monolayers and Multilayers of Conjugated Thiols, α,ω–Dithiols, and Thioacetyl–Containing Adsorbates. Understanding Attchments between Potential Molecular Wires and Gold Surfaces" J. Tour, et al, J. Am. Chem. Society 1995, 9529–9534.

"Adhesiion promotion between poly(methylmethacrylate) and metallic surfaces for LiGA evaluated by shear Stress measurements" C.G. Khan Malek, et al, J. Vac. Sci. Technol. B 16(6), Nov./Dec. 1998.

"Self–assembled monolayers of dithiols, diisocyanides, and isocyanothiols on gold: 'chemically sticky' surfaces for covalent attachment of metal clusters and studies of interfacial electron transfer" J. I. Henderson, et al, Inorganica Chimica Acta 242 (1996) 155–124.

"Single Electron Tunneling in Molecular Nanostructures of Single Crystal Gold Clusters Attached by Dithols to Au(111): . . . " R. G. Osifchin, et al, Polym. Mat. Sci. Eng. (1995) 73, pp. 208–209.

"Multi–Layer Formation of Copper Ions ($Cu^{2+}$) Deposited onto Self–Assembled Monolayers of Alkanedithiols on Au (111) Surfaces, W. Deng, et al, Jpn. J. Appl. Phys. vol. 39 (2000) pp. L751–L754.

"Studies on Adhesion of Functional Monomers with SH Group to Tooth Substrates and Dental Alloys", Kojima, et al, Div. Of Organic Material, Institue for Medical and Dental Engineering.

"Bonding fixed prosthodontic composite resin and precious metal alloys with the use of vinyl–thiol primer and an adhesive opaque resin" Atsuta, et al The Journal of Prosthetic Dentistry, Mar. 1992, vol. 67, No. 3, pp. 296–300.

(List continued on next page.)

Primary Examiner—James J. Seidleck
Assistant Examiner—Sanza L. McClendon
(74) Attorney, Agent, or Firm—Walter M. Douglas

(57) ABSTRACT

The invention is directed to the use of multifunctional thiol compounds as adhesion promoters and/or primers to enhance the adhesion of photo or electron beam curable polymers, coatings, adhesives, or sealants to gold, other precious metals, and their alloys. Actinic radiation and electron beam ("EB") radiation can be used to cure such compositions. The resulting cured compositions are optically clear, low $T_g$ ($\leq 30°$ C.), high refractive index (>1.50 at 1541 nm), thermally, oxidatively, and hydrolytically stable adhesives and/or coatings for glass and/or metal. The adhesive compositions containing such multifunction thiols can survive, without delamination or separation, testing conditions of 85° C. and 85% relative humidity ("RH") for a time in excess of 500 hours. In particular embodiments the invention is directed to the use of oligomers or prepolymers formed from the reaction of one or a plurality of multifunctional maleimide compounds with one or a plurality of multifunctional thiols to form materials for use in adhesives or compositions suitable for adhesive use in optical communications.

14 Claims, No Drawings

OTHER PUBLICATIONS

"Surface–Initiated Thermal Radical Polymerization on Gold" W. Huang, et al, 2001 American Chemical Society, Langmuir 2001, 17, pp. 1731–1736.

"Photo–oxidation and photo–reduction in alkyltmol monolayers self–assembled on gold" H. Riely, et al, J. Chem. Soc., Faraday Trans., 1996, 92(19), pp. 3629–3624.

"Adhesion promotors for gold: Bis–(ω–aminoalkyl)–disulfides" M. Glodde, et al, 1998 Elsevier Science Ltd.

"Investigation of Steel/Epoxy Adhesion Durability Using Polymeric Coupling Agents III. Influence of Coupling Agent Layer Thickness" R. G. Schmidt, et al, J. Adhesion 1989, vol. 27,. pp. 135–142.

"Polarized Grazing Angle FTIR Study of Molecular Orientation and Bonding of Thioglycolates at the Metal Interface" D. B. Yang, et al, Surf. Interface, Anal, (1996), 24(12), 803–810.

* cited by examiner

CURABLE ADHESIVE COMPOSITIONS

FIELD OF THE INVENTION

The invention is directed to adhesive or coating compositions for use with glass and/or metal materials. In particular, the invention is directed to compositions in which multifunctional thiols are used as adhesion promoters and/or primers to enhance the adhesion of photo or electron beam curable polymers, coatings, adhesives or sealants to gold and other precious metals, and alloys thereof.

BACKGROUND OF THE INVENTION

Adhesives are useful in optical communications for quickly joining elements. In such optical communication applications it is frequently desirable to join together two materials (substrates) having either similar or different coefficients of thermal expansion. When similar materials are joined together, the adhesive is selected to have a coefficient of thermal expansion similar to that of both materials. However, when materials having different coefficients of thermal expansion are used to make a device or element, the selection of an adhesive becomes more difficult. For example, when a device or element is made by joining an optical grating mounted on ultra low expansion ("ULE") glass to an optical prism made from a glass that has coefficient of thermal expansion different from that of the grating. This combination of grating and prism is frequently called a "grism". In such an exemplary device it is imperative that the line spacing of the optical grating not change with temperature. For this to be accomplished the adhesive must allow for expansion and contraction of the prism with temperature and must not appreciably transfer excessive force to the grating. In addition, since the adhesive is in the optical light path, it must be transparent at the operating wavelength of the device, for example, at operating wavelengths of 1550 or 1300 nm. Consequently, the adhesive should also be minimally absorbing and minimally scattering (optically clear) at the operating wavelengths. The adhesive should also match as nearly as possible the refractive index of the materials used to make the device. For instance, in the above grism the adhesive should match as closely as possible the refractive index of the prism in order to avoid excessive refraction of the light signal entering or exiting the prism. In the case of the exemplary prism with a refractive index in the range of 1.51 to 1.54 and operating at 1550 nm, the ideal adhesive should have a refractive index in this range.

It is also desirable that the manufacturing of optical devices be as inexpensive as possible. In the early stages of the telecommunications industry devices made of two or more elements were typically made by manually aligning and fusing the elements. Since that time advances have been made through the use of photocurable adhesives. While manual alignment may still occur, the bonding process using adhesives is much simpler than the old fusion process which involves heating the elements to be joined to a temperature at which the material of which they are made is sufficiently soft and flowable so as to join together to form a bond. By using photocurable adhesives the need for such heating and the working of hot materials can be avoided. For example, bringing the grating and prism together with the adhesive in between, optically aligning them, and then curing the adhesive in place by the use of actinic radiation to form the exemplary grism. For example, the curing can be accomplished by shining UV and/or visible light through the prism. The photocure is fast, allowing for perfect alignment, does not involve the use of solvents, does not require the need to heat the adhesive to effect the cure, and does not the require the use of a heating step to joining the grating to the prism—a step which might adversely effect the delicate line structure of the optical grating.

In some applications, optical devices are made from optical elements which themselves are made of different materials. For example, one element may be made of glass and the other made of metal. In such applications precious metals are frequently used because they are resistant to corrosion, rusting and other deleterious effects which may occur during use. When a device is made from one element made of a precious metal and another made of glass, the adhesive must bond to the surface of both the glass and the metal. Further, in order to provide the durability necessary for actual use, the adhesive must maintain its bond to both through accelerated aging cycles commonly used in the industry. For example, accelerated aging under conditions 85° C. and 85% relative humidity ("RH") for a minimum of 500 hours, and ideally up to 2000 hours. In addition, the adhesive must maintain its integrity through multiple temperature cycles, typically cycling between −40° C. to +85° C.

Formulating adhesives or coatings that have a high degree of adhesion to metals, and especially precious metals, is very difficult. The adhesive requirements enumerated precious metal surfaces to other surfaces such as glass. Further, low $T_g$ materials generally do not hold up well under conditions of 85° C. and 85% RH.

U.S. Pat. No. 4,497,890 to Herlbert claims a process for improving adhesion of polymeric photoresists to the precious metal gold. Various adhesion promoters were applied as primers to a gold metalized semiconductor substrate. The primers were claimed to enhance the adhesion of a polymeric photoresist to the gold surface during the development process. These adhesion promoters are not sufficient to enable the maintenance of adhesion to long term exposure (i.e. >500 hours) of 85° C. and 85% RH conditions. This is most likely because they were only designed to hold up to the photolithographic development process. The photolithography development process involves an exposure to acidic or basic, aqueous or solvent-based developing solutions. The exposure to the developing solutions is usually quite brief, ranging from a few seconds to several minutes, and is normally done at ambient temperature (approximately 18 to 25° C.) or slightly above ambient temperatures. Exposure to 85° C. and 85% RH for >500 hours is a much more aggressive condition.

Japanese Patent JP 10182779 to K. Murakami and T. Isonaka, assigned to Dainippon Ink and Chemicals Inc., discloses UV curable polyurethane-poly(meth)acrylate compositions as adhesives for optical disks with improved adhesion to gold or silicon nitride. These compositions however, contain urethane acrylates with polyester backbones that are susceptible to hydrolysis in the 85° C./85% RH accelerated aging tests, and hence are not suitable for optical communication use.

C. G. Khan Malek, and S. S. Das, *J. Vac. Science Technology B* (1998) 16(6); Pages 3543–2546, describe the enhancement of adhesion of a polymethylmethacrylate (PMMA) layer to gold by either using a novalac resist layer or an amino silane primer. This process involves several heating steps, under nitrogen, up to 180° C. and for times up to one hour. Heating at these temperatures is detrimental to many optical communications devices in which adhesives and/or coatings may be used.

Japanese patents JP 59-204676 and JP 59-189178, assigned to Mitsubishi Rayon Co., describe photosensitive adhesives comprising brominated epoxy resin with high refractive index useful for optical devices. However, while these brominated materials bond well to glass, they do not have a low $T_g$ value nor do they have the requisite thermal stability need for telecommunications applications.

M. Manning, *Adv. Sci. Technology* (1999), 17: pages 681–688 and pages 689–696; British Patent GB 2 289 472; and Japanese Patent JP 0303 1309 describe photocurable adhesives of various compositions for use with optical components. However, such materials, when cured, have high $T_g$ values and a re unsuitable for optical communications devices where low $T_g$, materials are required.

The art describes thiols and other sulfur compounds reacting with and bonding to gold metal. However, most of these references involve the formation of what are called self-assembled monolayers (SAMS) of the thiol compounds on the gold surface. Normally, the SAMs are deposited onto the gold surface by applying a dilute solution of the thiol in a solvent. The thiol reacts with the gold surface to form an Au—S bond. The solvent is then evaporated leaving a chemically bonded monolayer of the organic compound on the surface of the gold. In some cases, this organic monolayer can enhance the physical adhesion of other organic coating, ink, adhesive, or sealant materials to the gold. The monolayer does not chemically bond to such substances. Consequently, when there is exposure to extremely harsh environments, this physical adhesion is not adequate because there is no chemical bonding between the SAMs and the coating, ink adhesive, or sealant.

Research has also been done using multifunctional thiol materials as ingredients to form SAMs. In these applications, one of the thiol functional groups is chemically attached to the gold surface leaving the other thiol functional group available for further chemical reaction. This approach has been used to attach conductive polymers (J. M. Tour et al., *J. Am. Chem. Soc.* (1995)117, 9529–9534), metal clusters (J. I. Henderson et al., *Inorg. Chim. Acta* (1996) 115–124, and R. G. Osifchin, *Polymer. Mat. Sci. Eng.* (1995), 73, 208–209), and metal ions (W. Deng et al., *Jpn. J. Appl. Phys.* (2000) 39, L751–754) to gold metal. However, even though organic compounds with mercapto groups have shown the ability to bond to precious metals such as gold, palladium, and platinum, the use of thiols, especially in acrylate resin based adhesives has been difficult. M. Atsuta et al, *J. Prosthetic Dent.* (1992), 67(3), pages 296–300, state that thiols cause a chain transfer reaction during the propagation of vinyl or acrylic free radicals and considerably effect the degree of polymerization. Atsuta et al further state that if an acrylic mercaptan such as N-(4-mercaptophenyl) methacrylamide is used in an acrylic solvent, gelation of the solution ours during storage. The authors propose that this phenomenon is caused by the reaction of the mercapto group and the acrylic resin compound in solution. Such gelation is undesirable in adhesives and coatings used in optical communications devices because they can cause imprecise alignment, excessive diffraction and excessive absorbance of light.

W. Huang, et al, *Langmuir* (2001), 17(5), 1731, describe attempts to perform surface initiated thermal free radical polymerization o n gold metal. Azo type free radical initiators were attached to alkane thiol monolayers on gold. This idea was to graft polymer layers onto the gold surface. However, efficient grafting was not possible because desorbed thiols served as efficient chain transfer agents that inhibited the radical polymerization. In addition, the reactive radicals attacked the Au—S bonds that linked the initiator monolayer to the surface.

H. Rieley, et al, *J. Chem. Soc. Faraday Trans.* (1996) 92, 3629–3634, investigated the chemical behavior of several thiols and disulfides as SAMs ton gold. One of the compounds considered was octane-1,8-dithiol. They found the SAM layers to be susceptible to photo-oxidation and thus recommend that their usage should be restricted to applications where the SAM layer is kept away from light and is used under anaerobic conditions.

C. E. Evans et al., *Macromolecules Symposium* (1999), 142 (*Adv. Polymer Materials*), pages 23–31, describe a means of overcoming what they call the inadequate ruggedness of n-alkane, ω-terminated thiol and disulfide based SAMs on gold. By incorporating conjugated di acetylene groups within the monolayer structure and exposing these monolayers to UV radiation, a polymer forms within the single molecular layer through reaction of the acetylene bonds. The photopolymerization of the self-assembled monolayer film results in a conjugated polymer that is very robust and able to withstand temperature, solvent, and electrochemical extremes not previously possible with other monolayer systems. However, this approach requires the extra steps of depositing a thiol-acetylene based material as a primer layer, and then exposing the layer to UV radiation before the UV or electron beam curable material is deposited. The technique also requires a three step chemical synthesis of the conjugated diacetylenic disulfide starting materials. Finally, these materials are often colored due to their conjugated backbone. This coloration is an undesirable characteristic in many optical communications applications and precludes materials from use in optical communications applications.

Omura, et al, U.S. Pat. Nos. 5,064,495 and 5,085,726 assigned to Kuraray Co. Ltd. Corp., and M. Kimura et al, U.S. Pat. Nos. 5,795,497 and 6,133,338 assigned to Tokuyama Corp., disclose mercapto and/or sulfide functional compounds that enhance adhesion to gold and other precious metal alloys. The materials are used either as substrate primers or as ingredients in free radically polymerized adhesive formulations. The formulations are curable at room temperature or they can be thermally or photocured. However, all of the compounds require the presence of at least one olefinic double bond in the mercapto or sulfide functional compound. These materials are also extremely expensive and are thus unsuitable for most optical communications applications.

M. Glodde et al, *Internat. J. Adhesion and Adhesives* (1998), 18 (5), pages 359–364 and *Adhaes-Kleben Dichten* (1999), 43(9), pages 36–39, describe using bis-(ω-aminoalkyl) disulfides as adhesion promoters for gold. Such materials were designed for amine cured epoxy resin systems and are not suitable for photo or electron beam curable systems.

Japanese patent JP10176018 by Isonaka et al, assigned to Dainippon Ink and Chemicals, Inc., discloses UV curable adhesive compositions for joining optical disks having thin layers of gold, silicon nitride, or silicon carbide films on their surface. These compositions comprise (meth) acrylic oligomers based on polysulfide backbones. These materials also do not have adequate thermal, oxidative, and hydrolytic stability for the uses contemplated in this application.

Mercapto-esters have been recognized as effective coupling agents for bonding metals using acrylate and epoxy adhesives. R. G. Schmidt et al., J Adhesion (1989), 27, pages 135–142, claimed that the use of these compounds improved the bonding strength and durability of adhesive compositions. D. B. Yang et al., Surface Interface Anal. (1996), 24, pages 803–809, have evaluated such compounds on the surface of gold metal. No adhesion data was given in this study, but the testing described below shows that the mercaptoester functional groups do not hold up well to the 1000–2000 hour exposure to 85° C. and 85% RH conditions required for telecommunications devices.

Consequently, despite all the research and development which has been done in the area, there continues a need for adhesive material and compositions that can be used in telecommunications to join optical elements. This invention is invention seeks to fulfill such need.

SUMMARY OF THE INVENTION

In one aspect, the invention is directed to the use of multifunctional thiol compounds as adhesion promoters and/or primers to enhance the adhesion of photo or electron beam curable polymers, coatings, adhesives, or sealants to gold, other precious metals, and their alloys.

In another aspect, the invention is directed to the use of actinic radiation and electron beam ("EB") curable compositions for optically clear, low $T_g$ ($\leq 30°$ C.), high refractive index (>1.50 at 1541 nm), thermally, oxidatively, and hydrolytically stable adhesives and/or coatings for glass and/or metal.

In a further aspect, the invention is directed to the use of oligomers or prepolymers formed from the reaction of one or a plurality of multifunctional maleimide compounds with one or a plurality of multifunctional thiols to form materials for use in adhesives or compositions suitable for adhesive use in optical communications.

In an addition aspect, the invention is directed to the use of multifunctional thiols of general formula R—(SH)$_n$, wherein R is any organofunctional group, excluding polyesters, mercaptoesters, polysulfides and carbon-carbon double bond (—C=C—) containing materials, and n is equal to or greater than 2 (n$\geq$2). R includes linear, branched and cyclic hydrocarbons, alkylene oxides, alkylene sulfides, alkylene carbonates and alkylene carbamates.

In a further aspect, the invention is directed to the use of adhesives containing maleimide compounds having the general structure

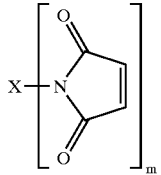

where X is a linear, branched or cyclic hydrocarbon, alkylene oxide, alkylene sulfide, alkylene carbonate or alkylene carbamate, and m is equal to or greater than 2.

In an additional aspect, the invention is directed photocurable compositions containing, among other substances, a photoinitiator, a dithiol compound, and a polymerizable monomer or oligomer.

The invention is further directed to the addition of a multifunctional thiol component of general formula R(SH)$_n$, where R is any organofunctional group excluding polyesters, polysulfides, mercaptoesters and carbon—carbon double bond containing groups, to curable chemical compositions which are either commercially available or known in the art and which can be used as an adhesive or coating for joining two optical elements or as a coating for an optical element. Such curable compositions must contain a component that is capable of reacting with the thiol functionality (—SH), and such compositions, when cured, is optically transparent at optical communications wavelengths.

The invention is also directed to an optical device an adhesive composition in accordance with the invention located between a first and a second optical element, said adhesive composition being used to join such elements. The composition, when cured, is optically clear, has a low $T_g$ ($\leq 30°$ C.), has high refractive index (for example, >1.50 at approximately 1541 nm), and exhibits thermal, oxidative, and hydrolytic stability making it suitable for use in optical communications. The composition of the invention is an adhesive or coating for glass and/or metal that can be used to join such glass and/or metal.

This invention is further directed to simplified procedures for making multifunction thiols suitable for use in adhesive compositions, and obviates the need for complex chemical synthesis and/or expensive raw materials.

Additional features and advantages of the invention will be set forth in the detailed description and the claims that follow, and will be readily apparent to those skilled in the art from the description or will be recognized by practicing the invention as described and claimed herein.

It is to be understood that both the foregoing general description and the following detailed description present embodiments of the invention, and are intended to provide an overview or framework for understanding the nature and character of the invention as it is claimed.

DETAILED DESCRIPTION OF THE INVENTION

Formulating coatings or adhesives that have very high adhesion to precious metals, for example, gold, palladium and platinum, is difficult. The inherent inertness of these metals makes it difficult to bond substances to surface made of these metals. Conventional adhesion promoters (for example, carboxylic acid or anhydride functional monomers, sulfonic or phosphoric acid derivatives, or organofunctional silanes, titanates, zirconates, etc.) are either ineffective, or not sufficiently effective, in many applications involving precious metal surfaces, for example, optical communications devices. This is especially true when using a photo or electron beam curable adhesive, coating, or sealant to bond an optical element to gold or other precious metal surfaces and then maintaining adhesion after exposure to severe testing conditions; for example, conditions of 85° C. and 85% RH. Exposure of adhesive bonds to conditions to 85° C. and 85% RH is a common practice in the testing of telecommunications devices. Normally, the duration of this testing is at least 500 hours and often 1000 or 2000 hours of exposure is required.

The invention teaches that multifunctional thiol compounds (also called multifunctional mercaptans) can be used as adhesion promoters and/or primers to enhance the adhesion of photo or electron beam curable polymers, coatings, adhesives, or sealants to gold, other precious metals, and their alloys. Such compounds contain a plurality sulfur-hydrogen bonds (—S—H) which can react with metal M to form —S-M bonds. The invention is thus in contrast to the references cited above that indicating such materials are either problematic or ineffective for this application. In the examples given herein specific dithiols are used as examples of multifunctional thiols. It is to be understood that in such examples the use of such dithiol is meant to be representative of multifunctional thiols generally.

The invention describes the preparation of materials that can be used as in adhesive and or coating compositions, or themselves as adhesives, such compositions having the requirements of (1) photocurability, (2) bonding glass to precious metals, (3) a $T_g \leq 30°$ C., (4) a cured refractive index greater than or equal to 1.50 at 1550 nm, (5) being optically clear, and (6) maintaining their optical clarity and adhesion after temperature cycling from −40° C. to +85° C. and/or exposure to 85° C. and 85% RH for a minimum of 500 hours. At the present time there are no commercial compositions available that can achieve such performance and there are no literature references disclosing materials that would fulfill such requirements.

In its broadest aspect the adhesive/coating compositions of the invention comprises two essential components:

(1) a free radical polymerizable component that is curable by use of actinic radiation (photocurable) or is electron beam curable, and (2) a multifunctional thiol component.

In this broad embodiment, any composition (1) known in the art may be used with the multifunctional thiol to form an adhesive/coating of the invention. Visible and UV radiation are the preferred form of actinic radiation.

In addition, in one embodiment, as evidenced by the Examples given herein, the invention is directed to the addition of multifunctional thiols to adhesives and/or coatings known in the art which have a component containing functional groups capable of reacting with the thiol functional group, and particularly to commercially available adhesives and/or coatings containing functional groups capable of reacting with the thiol functional group.

In preferred embodiments the compositions comprise:

1. An oligomer or prepolymer formed from the reaction of one or more multifunctional maleimides with one or more multifunctional thiols. The maleimide should have the general structure:

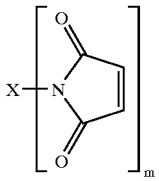

where X is a linear, branched, or cyclic hydrocarbon, alkylene oxide, alkylene sulfide, alkylene carbonate, or alkylene carbamate and $m \geq 2$.

2. A multifunctional thiol having the structure:

where R is a linear, branched, or cyclic hydrocarbon, alkylene oxide, alkylene sulfide, alkylene carbonate, or alkylene carbamate and $m \geq 2$. The stoichiometric ratio of maleimide to thiol can vary from 1:10 to 10:1. Where the stoichiometry approached 1:1, very high viscosities arc attained.

If the composition is to be cured with actinic radiation, a photoinitiator component is necessary. For UV or visible light curing, any photoinitiator known in the art to be useful for UV curing can be used in practicing the invention. Similarly, for visible light curing, any photoinitiator known in the art to be used for visible light curing can be used in practicing the invention.

For stoichiometries where oligomers are synthesized using an excess of maleimide, such oligomers may be used "as is" if their viscosity is sufficiently low for the intended application. However, when the viscosity is too high for the intended application, the inclusion of a viscosity reducing monomer component is necessary. This viscosity reducing monomer component can be any material capable of reacting with the maleimide functionality during the photocure. The monomer should also be chosen so as to preserve or enhance the refractive index and glass transition temperature of the cured formulation in order to match the desired specifications of the adhesive or coating.

For stoichiometries where oligomers are synthesized with an excess of thiols, there may be present unreacted thiol in the oligomer component. This is acceptable and is within the range of the invention. However, in such instances it is necessary to mix the oligomers with monomers containing double or triple bonds that react with the excess thiol during photocuring. Such monomers should be multifunctional, containing two or more double or triple bonds. If these monomers are not readily free radical homopolymerized, the added amount of monomer should stoichometrically approximately match the amount of oligomer thiol functionality present in the oligomer. In the case of monomers that readily hompolymerize, stoichiometrically large excesses of monomer are acceptable.

The actinic radiation (photocurable) or electron beam curable composition can be any free radically polymerizable or electron beam curable composition that is typically used as a coating, ink, adhesive, sealant, etc. Compositions of these types are well known in the art. Typically, these are based on an oligomeric component, a monomer component, and optionally an additive component. If photocuring is intended, a photoinitiator component is also necessary. For electron beam curing, a photoinitiator component is not necessary, but may be optionally included.

Typically, the oligomer component of the adhesive/coating composition is an acrylate or methacrylate functional material based on a urethane, epoxy, polyester, polyether, silicone, or fluorocarbon material, and similar materials known in the art. That is, the acrylate or methacrylate functional group is pendent from a backbone material urethane, epoxy, polyester, polyether, silicone, or fluorocarbon material, and similar materials known in the art. The monomer component can be any low molecular weight (<500MW), (meth)acrylate functional material. Other free radically polymerizable functional groups are sometimes used in place of, or in addition to, the acrylate or methacrylate functional oligomer and/or monomer components. Examples of these functional groups are maleimides, maleates, acrylamides, methacrylamides, styrenes, vinyl ethers, vinyl esters, and similar groups known in the art.

Normally, the oligomer component is viscous and the monomer component is used to adjust the formulation to the desired viscosity. Alternatively, if it is required that the formulation be low in viscosity, the oligomer component may not be used and the formulation may contain only one or a plurality of monomer components. Additives can be used in the adhesive formulations of the invention, and such additives include pigments, fillers, surfactants, wetting agents, slip agents, etc. Care must be exercised when such additives are used in an adhesive/coating formulation that will be present in the optical path of a device prepared using the adhesive so as to avoid detrimental effects due to the presence of the adhesive; for example, excessive absorbance. The photoinitiator component, if used, can be any of the commercially available photoinitiators for free radical curing, or similar initiators that may from time-to-time become known.

Substances of particular utility in practicing the invention are oligomers or prepolymers formed from the reaction of one or more maleimides with one or more multifunctional thiols. The maleimide should have the structure:

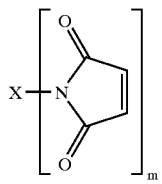

wherein X is a linear, branched or cyclic hydrocarbon, alkylene oxide, alkylene sulfide, alkylene carbonate, or alkylene carbamate and $m \geq 2$.

The second essential component is a multifunctional thiol, which is defined as an organic molecule with more than one thiol functional group per molecule and has the following structure:

where R is any organofunctional group excluding polyesters, mercapto esters, polysulfides, or carbon-carbon double bond containing materials, and $n \geq 2$. This component is normally present in amounts from 0.01 to 20 wt. % of the formula; preferably from 0.05 to 15 wt. % of the formula; and most preferably from 0.10 to 10 wt. % of the formula. Examples of multifunctional thiols that can be used in accordance with the invention are, but are not limited to: $C_1$ to $C_{20}$ α, ω-dithiols; $C_1$ to $C_{20}$ branched molecules having two or more terminal thio groups; 2-mercapto ethyl sulfide [$(HSCH_2CH_2)_2S$]; triethylene glycol dimercaptan and similar polyglycol dimercaptans and similar di-olefin dimercaptans; ethylcyclohexyl dimercaptan; Capcure 3–800 or Capcure LOF (Cognis Corp.) and similar commercially available dimercaptans; ortho-, meta-, and para-benzene dithiol; ortho-, meta-, and para-benzene dimethane thiol [o-, m- and p-$(HSCH_2)_2C_6H_4$]; pentaerythrityl tetrathiol; 4,4'-thiobisbenzene thiol; thiol terminated polyethers; thiol terminated polythioethers; thiol terminated polyurethanes; and similar multifunctional thiols known in the art.

The stoichiometry of the reaction can range from 1:10 to 10:1 maleimide to thiol. When the stoichiometries approach 1:1, very high viscosities are attained. It is preferable, although not necessary, to have excess maleimide. If the oligomers are synthesized with excess maleimide, they have the following general chemical structure (shown where for m=n=2):

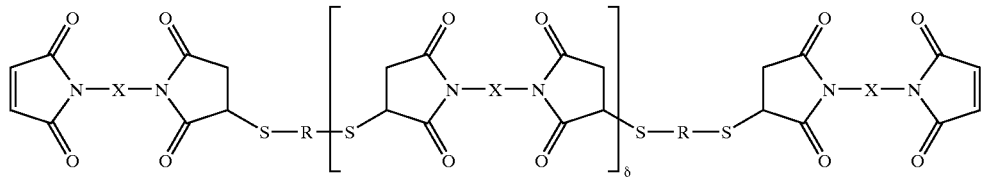

where $\delta \geq 0$; and X and R, which may be the same or different, is a linear, branched or cyclic hydrocarbon, alkylene oxide, alkylene sulfide, alkylene carbonate or alkylene carbamate, or mixture thereof.

For stoichiometries where there is significant excess of maleimide, there may be unreacted maleimide in the oligomer. This is acceptable and is considered completely within the range of this invention. The excess maleimide will be polymerized during the curing of composition.

If the oligomers are synthesized with excess thiol, they have the following general structure (also shown where m=n=2)

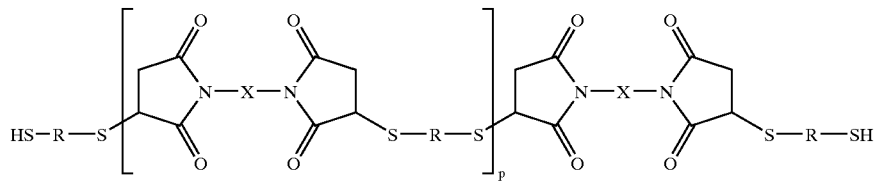

where $\rho \geq 0$; and X and R, which may be the same of different, is a linear, branched or cyclic hydrocarbon, alkylene oxide, alkylene sulfide, alkylene carbonate or alkylene carbamate, or mixture thereof.

For stoichiometries where there is significant excess of thiol, there may be unreacted thiol in the in the oligomer. This is acceptable and is considered completely within the range of this invention.

For oligomers made with excess maleimide, if their viscosities are low enough for application to a substrate by any of the conventional methods commonly used, for example, spin coating, they may be used "as is". However, in some cases it may be necessary to add a selected viscosity reducing component. Such components must be capable of reacting with the maleimide functionality during the photo-cure. Typically, such components are low molecular weight ("MW") monomers or oligomers (generally <250 MW). As used herein, the term "monomer" is meant to signify both. The monomer should also be chosen to preserve or enhance the refractive index and glass transition temperature of the cured formulation in order to match the desired specifications of the adhesive or coating. Acceptable monomer functionalities are, but are not limited to, acrylates, methacrylates, thioacrylates, thiomethacrylates, acrylamides, vinyl ethers, vinyl sulfides, propenyl ethers, maleimides, itaconates, crotonates, N-vinyl amides, styrenes, vinyl esters, allyl ethers and similar compounds known in the art, and mixtures thereof. It is preferred, but not necessary, that the monomer be monofunctional. That is, it contains one functional group per molecule that is capable of polymerizing with the maleimide functional group. The acrylate group is the preferred functionality and examples of acceptable acrylate monomers are 2-phenoxyethyl acrylate, ethoxylated or propoxylated phenoxyethyl acrylate, isobornyl acrylate, ethoxylated or propoxylated nonyl phenol acrylate, dicyclopentenyl acrylate, dicyclopentenyl oxy-ethyl acrylate, benzyl acrylate, benzyl methacrylate, tetrahydrofurfuryl acrylate, ethoxylated or propoxylated tetrahydrofurfuryl acrylate and similar acrylates known in the art.

For oligomers made with excess thiol, it is necessary to mix these with monomers containing double or triple bonds that are capable of reacting with the thiol functionality during the photocure. Such monomers should largely be multifunctional and also be selected to preserve or enhance the refractive index and glass transition temperature of the cured formulation in order to match the desired specifications of the adhesive or coating. Accept able monomer functionalities are, but are not limited to, acrylates, methacrylates, thioacrylates, thiomethacrylates, acrylamides, vinyl ethers, vinyl sulfides, propenyl ethers, maleimides, maleates, itaconates, crotonates, N-vinyl amides, styrenes, and allyl ethers. The preferred functionalities are acrylates, vinyl ethers, and allyl ethers. If the monomer does not readily free radical homopolymerization, for example, vinyl ethers and allyl ethers, the amount of the added monomer should stoichiometrically approximately match the amount of the excess thiol functionality. That is, the amount of thiol in excess of the amount needed to react to form the oligomer. In the case for monomers that do readily hompolymerize, for example, acrylates, stoichiometrically large excesses of monomer are acceptable.

It is also possible when preparing the maleimide/thiol oligomers of this invention that more than one multifunctional thiol and/or more than one multi functional maleimide are used at the same time. Such combinations may be desirable to tailor the final physical properties of the formulations, for example, the refractive index or $T_g$.

Polymerization initiators suitable for use in the compositions of the present invention include any initiator activated by actinic radiation or an electron beam, including free radical initiators. For acrylate containing compositions, ketonic photoinitiating and/or phosphine oxide initiators are preferred. When used in the compositions of the present invention, the photoinitiator is present in an amount sufficient to provide rapid ultraviolet curing, generally in an amount in the range of 0.1 wt. % to 10 wt. %, and preferably an amount in the range of 0.25 wt. % to 8 wt. %.

Suitable photoinitiators include, without limitation, 1-hydroxycyclohexylphenyl ketone (e.g., Irgacure 184 available from Ciba Specialty Chemical (Tarrytown, N.Y.)), (2,6-dimethoxybenzoyl)-2,4,4-trimethylpentyl phosphine oxide (e.g., in commercial blends Irgacure 1800, 1850, and 1700, Ciba Specialty Chemical), 2,2-dimethoxyl-2-phenyl acetophenone (e.g., Irgacure 651, Ciba Specialty Chemical), bis(2,4,6-trimethylbenzoyl)phenyl phosphine oxide (e.g., Irgacure 819, Ciba Specialty Chemical), (2,4,6-trimethylbenzoyl)diphenyl phosphine oxide (e.g., in commercial blend Darocur 4265, Ciba Specialty Chemical), 2-hydroxy-2-methyl-1-phenylpropane-1-one (e.g., in commercial blend Darocur 4265, Ciba Specialty Chemical) and combinations thereof. Other photoinitiators are continually being developed and used in coating compositions on glass fibers. Any suitable photoinitiator can be introduced into compositions of the present invention.

Compositions within the scope of this invention are suitable for, and are intended to be used as actinic radiation or electron beam cured coatings, inks, adhesives, sealants or primers for gold, other precious metals and alloys thereof, and additional selected metals, for example, nickel and copper. As used herein, the term "precious metal(s)" means gold, silver, platinum, palladium, iridium, osmium, rhodium; alloys of two or more of said precious metals; and alloys of one or more said precious metals with nickel or copper.

The adhesive/coating compositions of the invention can be applied to any metal substrate by any conventional means such as dipping, spraying, brushing, printing, coating, and other methods known in the art. The application can also be as simple as dispensing onto the substrate from a syringe or pipette. After the composition is applied to the substrate, it is cured with actinic light or an electron beam. The composition can also be applied by suitable means to areas between the precious metal substrate and some other actinic light or electron beam transparent or partially transparent substrate; for example, glass and plastic or polymeric materials. The composition is then cured through the transparent or partially transparent substrate. Alternatively, the composition can be applied to the precious metal and/or the transparent or partially transparent substrate and then the two substrates brought together and cured.

An example of the utility of this invention is when bonding a gold optical grating to a glass prism to form what is often called a grism. Compositions of the invention are ideal for use as adhesives in such a device. In this application, the adhesive composition is used to bond the gold grating to the glass prism. This bond must be extremely durable and able to withstand aggressive accelerated aging testing such as exposure to conditions of 85° C. and 85% relative humidity (RH) for a minimum of 500 hours, and ideally up to 2000 hrs. The adhesive must also maintain adhesion through multiple temperature cycles from 40° C. to 85° C. In order to accomplish this goal the adhesive must have excellent adhesion to the gold metal as well as to the glass. While many conventional adhesives have adequate adhesion to glass, their ability to bond gold or other precious metals and their alloys is insufficient. Also, since the adhesive in this application is actually in the optical light path, it must ideally be transparent at the operating wavelength of the device. The operating wavelength in this case is 1550 nm. Therefore, the adhesive should be minimally absorbing and minimally scattering (optically clear) at this wavelength. Compositions within this invention meet these criteria.

The invention will be further clarified by the following examples.

EXAMPLE 1

Preparation of a Maleimide/thiol Oligomer

A maleimide/thiol oligomer was synthesized from QMI 501 (a bismaleimide of a $C_{36}$ hydrocarbon diamine commercially available from Dexter Corp., San Diego, Calif.) and 4,4'-bismercaptophenyl sulfide (MPS).

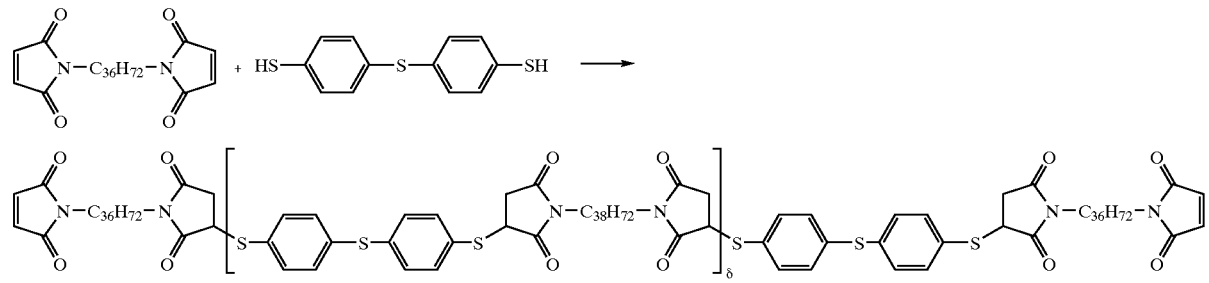

where δ≧0.

This reaction was carried out as follows: 14 g of QMI 501 was dissolved in approximately 13 mL of tetrahydrofuran (THF) in a 50 mL three neck round bottom flask equipped with a mechanical stirrer. Subsequently, 2.25 g of MPS were added to the vortex of the mix. When the MPS had dissolved, 0.0174 g of paramethoxy phenol (MEHQ), 15 μL of 3-aminopropyltrimethoxy silane (Silquest A 110 from Witco Corp.) and 501 L of Genorad 16 (Rahn USA Corp.) were added. A reaction exotherm occurred shortly after these ingredients were added. The reaction flask was then immersed into an oil bath at 85° C. The material was mixed at approximately 600 rpm for 1 hour with a dry air purge. During this step, the THF evaporates and the viscosity of the mixture increases. An infrared spectrum of the reaction product shows no S—H bond absorption at 2650 cm$^{-1}$. This oligomer was used to make the following formulation.

| 69.0% | Oligomer |
| 23.0% | Aronix M-111 (Nonylphenol ethoxylate acrylate monomer from Toagasei Chemical) |
| 4.0% | Irgacure 1850 (Photoinitiator, Ciba Geigy Corp) |
| 3.0% | 3-Mercaptopropyl trimethoxy silane (Silquest A-189, Witco Corp.) |
| 1.0% | Irganox 1035 (Antioxidant, Ciba Geigy Corp.) |

A 0.5 mil drawdown of this formulation was prepared on glass using a Bird applicator. The drawdown was cured, under nitrogen, using three passes on a conveyor system under a Fusion Systems Corp. F-450, D lamp UV source at 8 ft/min. The measured refractive indices are:

1.5521, liquid, measured at 589 nm 1.53543, cured, measured at 632 nm 1.52012, cured, measured at 1541 nm The liquid refractive index was measured using an Abbe 3L Refractometer. The cured film refractive indices were measured using a Metricon Model 2010 Prism Coupler Instrument. The $T_g$ of this UV cured formulation was measured using a dynamic mechanical analyzer (DMA). The $T_g$ was 28.4 g° C. as determined from the peak of the tan delta curve.

EXAMPLE 2

Synthesis of a Maleimide/thiol Oligomer

A maleimide/thiol oligomer was synthesized from QMI 501 and 2,2'-dimercapto diethyl sulfide (DMDS).

wherein δ≧0.

This reaction was carried out as follows. 50 g of QMI-501 were dissolved in 50 mL of THF in a 250 mL 3 neck round bottom flask equipped with a mechanical stirrer. Subsequently, 8.05 g of DMDS were added to the vortex of the mix. When the mix appeared homogeneous, 0.065 g of MEHQ, 50 μL of Silquest A-1110, and 100 μL of Genorad 16 were added. A reaction exotherm occurred shortly after these ingredients were added. The reaction flask was then immersed into an oil bath at 85° C. The material was then mixed for approximately 1 hour with a dry air purge. During this step, the THF evaporates and the viscosity of the mixture increases. The following ingredients were added and mixed for 15 minutes:

| 16.57 g | Aronix M-111 |
| 3.13 g | Irgacure 1850 |
| 0.83 g | Irganox 1035 |

Films were drawn down and UV cured, and refractive indices were measured as in Example 1. The measured refractive indices are:

1.5200, liquid, measured at 589 nm 1.52685, cured, measured at 632 nm 1.51223, cured, measured at 1541 nm The $T_g$ of this UV cured formulation was 13.4° C. as measured from the peak of the tan delta curve from DMA.

EXAMPLE 3

A formulation was made exactly as in Example 2 except 2-phenoxyethyl acrylate was substituted for the Aronix M-111. The $T_g$ and refractive index data for the UV cured films of this formulation were measured as in Example 1. The measured refractive indices are:

1.5222, liquid, measured at 589 nm 1.5328, cured, measured at 632 nm 1.5182, cured, measured at 1541 nm The $T_g$ of this UV cured formulation was 2.9 IC as measured from the peak of the tan delta curve from DMA.

Comparative Example 1

A formulation was prepared exactly as in Example 3, except that QMI-501 was substituted for the maleimide/thiol (QMI-501/DMDS) oligomer. The $T_g$ of an UV cured film prepared exactly as in Example I was measured at 54.7 IC, which is too high for this application.

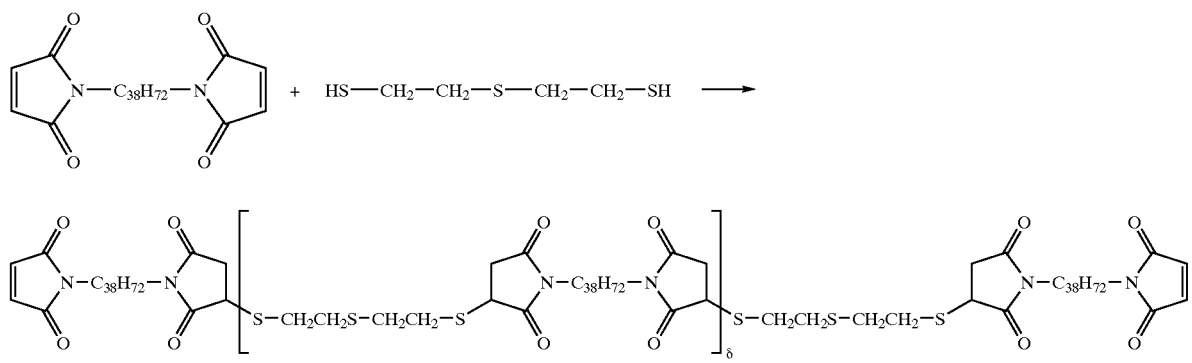

EXAMPLE 4

A formulation was made exactly as in Example 2 except isobornyl acrylate was substituted for the Aromix M-111. The $T_g$ and refractive index data for the UV cured films of this formulation were measured as in Example 1.

1.5133, liquid, measured at 589 mm 1.5213, cured, measured at 632 mm 1.5129, cured, measured at 1541 nm The $T_g$ of this UV cured formulation was 21.5 IC as measured from the peak of the tan delta curve from DMA.

Comparative Example 2

A formulation was prepared exactly as in Example 4 but QMI-501 was substituted for the maleimide/thiol (QMI-501/DMDS) oligomer. The $T_g$ of an UV cured film prepared exactly as in Example 1 was measured at 80.4° C., which is too high for this application.

EXAMPLE 5

To log of the formulation in Example 3, a 200 µL of KR-55 (tetra-(2,2-diallyloxymethyl)butyl, di(ditridecyl) phosphito titanate [Kenrich Petrochemicals Inc.] was added and mixed until homogeneous. This adhesive formulation was used to bond a 1 inch by 2 inch piece of LLF6 glass (Schott Glass Corp.) to the same size gold optical grating mounted to ULE glass (Ultra Low Expansion glass, Corning Inc.). The adhesive was UV cured through the LLF6 glass. Then the sample was exposed to 85° C./85% RH conditions for 24 hrs. The sample showed no signs of delamination whereas the standard adhesive used to bond grisms (Masterbond UV 15-7 from Masterbond Corp.), completely delaminated under these testing conditions.

EXAMPLE 6

A formulation was made using the maleimide/thiol oligomer from Example 2 as follows:

75.00% Maleimide/thiol oligomer 24.00% Isobornyl acrylate 1.00% Irgacure 819-photoinitiator (Ciba Geigy Corp.)

The $T_g$ and refractive index data for the UV cured films of this formulation were measured as in Example 1. The refractive indices are as follows:

1.5137, liquid, measured at 589 nm 1.5178, cured, measured at 632 nm 1.5130, cured, measured at 1541 nm.

The $T_g$ of this UV cured formulation was 20.2° C. as measured from the peak of the tan delta curve from DMA.

This adhesive was used to bond fused silica glass to a gold optical grating. Several 1¼ by 2 inch fused silica glass pieces were precleaned by rinsing with methanol. After air drying, they were subjected to oxygen plasma treatment for 10 minutes at 100W and 1 torr oxygen in a Branson IPC 3000 Series Plasma Controller Reactor Center. The fused silica pieces were then primed on the bonding surface with a 30 wt. % solution of 3-mercaptopropyl trimethoxy silane (Silquest A-189, Witco Corp.) in isopropanol. This was done by first mounting the fused silica pieces in a spin coater and then applying about 0.5 mL of the silane solution to the center of the fused silica piece using a plastic disposable pipette. The fused silica piece was then spun at 3000 rpm for 30 sec. The piece was allowed to dry for about 12 hr and then placed into a controlled humidity chamber at 23±2° C. and 50±5% RH for 16 to 24 hours. The adhesion test samples were then bonded as follows.

About 0.5 ml of adhesive was applied to the silane treated fused silica. A 1 inch by 1½ inch gold optical grating that was mounted on fused silica was carefully brought into contact with the adhesive. Then, with a circular motion, the grating was used to spread out the adhesive until the entire surface of the grating was covered and there was a minimum amount of bubbles. The adhesion sample was then turned over so the grating was on the bottom. The adhesive was then UV cured through the fused silica using a Greenspot UV Curing System (American Ultraviolet Company). The end of the lightguide was mounted 2 inches from, and perpendicular to the bond line. The cure time was three cycles at 99.99 seconds each. A fourth UV cure cycle was used to cure the perimeter of the bond line by rotating the bonded piece under the UV light fiber at very close distance. The samples were left set over night and then placed into a humidity chamber at 85,° C. and 85% RH. Three samples using this adhesive were aged under these conditions for four days. The samples showed only a slight delamination along the edges and corners. In contrast, samples of the standard adhesive (Masterbond UV15-7 from Masterbond Corp.) showed significant delamination across the entire surface of the grating after only one day.

Another sample was placed in a temperature cycling chamber for 97 days (2328 hrs.). The temperature was cycled from −40° C. to 85° C. with heating and cooling rates of 2° C./min and 30 minute holds at −40° C. and 85° C. This corresponds to 8 cycles per day. The sample showed no delamination with only a few small bubbles along one edge and a slightly textured gold surface.

EXAMPLE 7

To the adhesive in Example 6 was added one percent by weight of isooctyl-3-mercaptopropionate. The $T_g$ and refractive index data for the UV cured films of this formulation were measured as in Example 1. The measure refractive indices are:

1.5120, liquid, measured at 589 nm 1.5167, cured, measured at 632 nm 1.5133, cured, measured at 1541 nm.

The $T_g$ of this UV cured formulation was 20.6° C. as measured from the peak of the tan delta curve from DMA.

Three samples of this adhesive were bonded and cured exactly as in Example 6. These samples were subjected to 85° C./85% RH conditions for two months (1440 hrs.). The samples showed no delamination with only a slight surface texture on the gold, some small bubbles along one edge and a slight haziness at the corners.

EXAMPLE 8

A maleimide/thiol oligomer was synthesized from 2,2'-bis[4-(4-maleimidiphenoxy)phenyl]propane (BMI-80 from KI Chemical Industry Co. Ltd.) and DMDS.

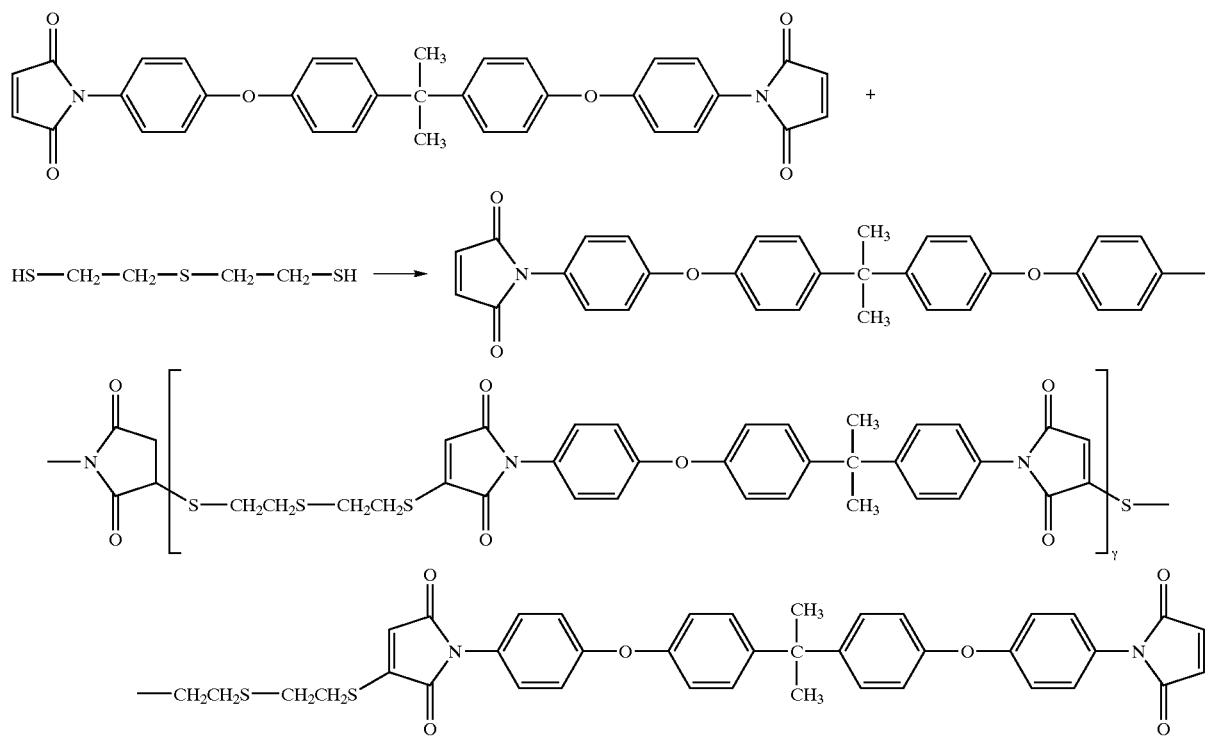

Where γ≧0.

The reaction was carried out as follows: 125 g of BMI-80 and 12.5 mL of THF were added to a 100 mL 3 neck round bottom flask equipped with a mechanical stirrer. Subsequently, 2.0 g of DMDS was added to the vortex of the mix. When the mix appeared homogeneous, 0.019 g of MEHQ, 25 μL of Silquest A-1110, and 25 μL of Genorad G-16 were added. A reaction exotherm occurred shortly after these ingredients were added forming a clear red-brown, viscous liquid. The reaction flask was then immersed into an oil bath at 85° C. The material was mixed at approximately 600 rpm for about 5 minutes under a dry air purge. Next, 10 g of 2-phenoxyethyl acrylate were added. The contents of the reaction flask were mixed for another 10 minutes at 85° C. under a dry air purge. Another 10 g of 2-phenoxyethyl acrylate were added followed by an additional 10 minutes of mixing. Finally, 0.34 g of Irgacure 819 photoinitiator was added and mixed for 5 minutes. The reaction mixture was then filtered through a 1 μm filter. The $T_g$ and refractive index data for the UV cured films of this formulation were measured as in Example 1. The refractive indices are:

1.5451, liquid, measured at 589 nm 1.5696, cured, measured at 632 nm 11.5544, cured, measured at 1541 nm The $T_g$ of this UV cured formulation was 27.2° C. as measured from the peak of the tan delta curve from DMA.

It will be apparent to those skilled in the art that various modifications and variations can be made to the present invention without departing from the spirit and scope of the invention. Thus, it is intended that the present invention covers the modifications and variations of this invention provided they come within the scope of the appended claims and their equivalents.

What is claimed is:

1. An actinic radiation or electron beam curable composition suitable for use as an adhesive or coating, said composition comprising:
   (a) an oligomer of formed by the reaction of
      (i) a maleimide compound of general formula

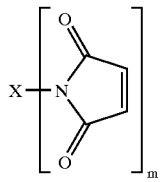

wherein X is a linear a linear, branched or cyclic hydrocarbon, alkylene oxide, alkylene sulfide, alkylene carbonate or alkylene carbamate, and m≧2; and
      (ii) at least one multifunctional thiol compound of general formula R—(SH)$_M$, wherein R is any organofunctional group including linear, branched and cyclic hydrocarbons, alkylene oxides, alkylene sulfides, alkylene carbonates and alkylene carbamates; and excluding polyesters, polysulfides, mercaptoesters and carbon-carbon double bond containing groups;
   (b) a viscosity reducing polymerizable component, wherein the viscosity reducing component is selected from the group consisting of a monomeric, mono- or polyfunctional acrylate, methacrylate, thioacrylate and thiomethacrylates compound; and
   (c) optionally, a free radical photoinitiator compound.

2. The composition according to claim 1, wherein the maleimide oligomer of 17(a) is formed by the reaction of a stoichiometric excess of one or a plurality of maleimide compounds with one or a plurality of a multifunctional thiol compounds, said oligomer having the general structure:

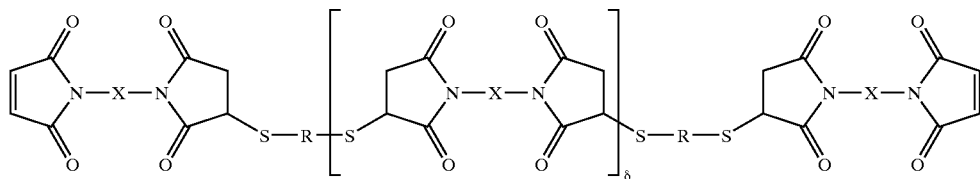

where m=n=2 and $\delta \geq 0$; and X and R, which may be the same or different, is a linear, branched or cyclic hydrocarbon, alkylene oxide, alkylene sulfide, alkylene carbonate or alkylene carbamate, or mixture thereof.

3. The composition according to claim 2, wherein said acrylate compound is selected from the group consisting of 2-phenoxyethyl acrylate, ethoxylated or propoxylated phenoxyethyl acrylate, isobornyl acrylate, ethoxylated or propoxylated nonyl phenol acrylate, dicyclopentenyl acrylate, dicyclopentenyl oxyethyl acrylate, benzyl acrylate, benzyl methacrylate, tetrahydrofurfuryl acrylate, ethoxylated or propoxylated tetrahydrofurfuryl acrylate and similar acrylates known in the art.

4. The composition according to claim 1, wherein the maleimide oligomer of 17(a) is formed by the reaction of a stoichiometric excess of one or a plurality of multifunctional thiol compounds with one or a plurality of maleimide compounds, said oligomer having the general structure:

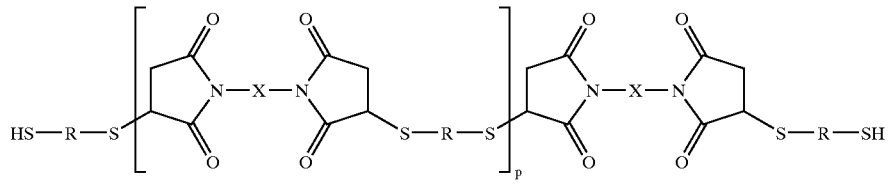

where m=n=2 and $\rho \geq 0$; and X and R. which may be the same or different, is a linear, branched or cyclic hydrocarbon, alkylene oxide, alkylene sulfide, alkylene carbonate or alkylene carbamate, or mixture thereof.

5. The composition according to claim 4, wherein said acrylate compound is selected from the group consisting of 2-phenoxyethyl acrylate, ethoxylated or propoxylated phenoxyethyl acrylate, isobornyl acrylate, ethoxylated or propoxylated nonyl phenol acrylate, dicyclopentenyl acrylate, dicyclopentenyl oxyethyl acrylate, benzyl acrylate, benzyl methacrylate, tetrahydrofurfuryl acrylate, ethoxylated or propoxylated tetrahydrofurfuryl acrylate and similar acrylates known in the art.

6. The composition according to claim 1, wherein when said composition is cured using actinic radiation said composition further includes a free radical photoinitiator, and when said composition is cured by electron beam radiation said composition optionally includes a free radical photoinitiator.

7. The composition according to claim 1, wherein said composition, when cured, has a $T_g \leq 30°$ C. and a reactive index greater than 1.50.

8. The composition according to claim 2, wherein said composition, when curd, has a $T_g \leq 30°$ C. and a refractive index greater than 1.50.

9. The composition according to claim 4, wherein said composition, when cured, has a $T_g \leq 30°$ C. and a refractive index greater than 1.50.

10. A composition suitable for use as an adhesive or coating, said composition comprising:
(a) an oligomer of formed by the reaction of
(i) a maleimide compound of general formula

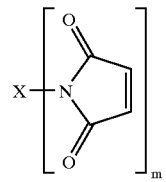

wherein X is a linen a linear, branched or cyclic hydrocarbon, alkylene oxide, alkylene sulfide, alkylene carbonate or alkylene carbamate, and $m \geq 2$; and
(ii) at least one multifunctional thiol compound of general formula R—(SH)$_n$, wherein R is any organofunctional group including linear, branched and cyclic hydrocarbons, alkylene oxides, alkylene sulfides, alkylene carbonates and alkylene carbamates; and excluding polyesters, polysulfides, mercaptoesters and carbon—carbon double bond containing groups;
(b) a viscosity reducing polymerizable component, wherein the viscosity reducing component is chosen so as to preserve or enhance the refractive index and glass transition temperature $T_g$ of the cured formulation (a)(i) and (ii), said formulation having $T_g \leq 30°$ C. and an refractive index greater than 1.50,
wherein the viscosity reducing polymerizable component is one or a plurality of monomers selected from the group consisting of acrylates, methacrylates, thioacrylates, thiomethacrylates, acrylamides, vinyl ether, vinyl sulfides, propenyl sulfides, maleimides, itaconates, crotonates, N-vinyl amides, styrenes, vinyl cuter, allyl esters and similar compounds known in the art, and mixtures thereof.

11. The composition according to claim 10, wherein the maleimide oligomer of (a)(i) and (ii) is formed by the reaction of a stoichiometric excess of one or a plurality of maleimide compound with one or a plurality of a multifunctional thiol compounds, said oligomer having the general structure:

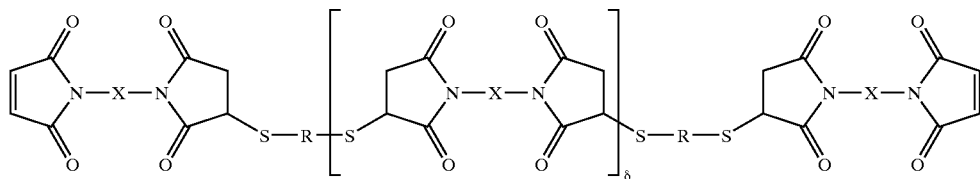

wherein m=n=2 and δ≧0, and X and R, which may be the same or different, is a linear, branched or cyclic hydrocarbon, alkylene oxide, alkylene sulfide, alkylene carbonate or alkylene carbamate, or mixture thereof.

12. The composition according to claim 10, wherein the maleimide oligomer of 2(b) is formed by the reaction of a stoichiometric excess of one or a plurality of multifunctional thiol compounds with one or a plurality of maleimide compounds, said oligomer having the general structure:

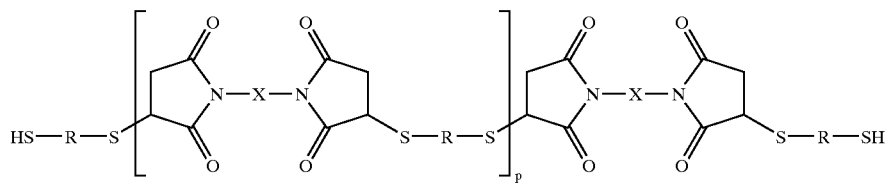

where m=n=2 and p≧0; and X and R, which may be the same or different, is a linear, branched or cyclic hydrocarbon, alkylene oxide, alkylene sulfide, alkylene carbonate or alkylene carbamate, or mixture thereof.

13. The composition according to claim 11, wherein R is selected from the group consisting of $C_1$ to $C_{20}$ α,ω-dithiols; $C_1$ to $C_{20}$ branched molecules having two or MOM terminal thiol groups; 2-mercaptoethyl sulfide; triethylene glycol dimercaptan and similar polyglycol dimercaptans and similar di-olefin dimercaptans; ethylcyclohexyl dimercaptan; commercially available dimercaptans as described in the specification; ortho-, meta- and para-benzene dithiol; ortho-, meta- and para-benzene dimethane dithiol [o-, m- and p-$(HSCH_2)_2C_6H_4$]; pentaerythirtyl tetrathiol; 4,4-thiobisbenzene thiol; thiol terminated polyethers; thiol terminated polythioethers; thiol terminated polyurethanes; and similar multifunctional thiols known in the art.

14. The composition according to claim 12, wherein R is selected from the group consisting of $C_1$ to $C_{20}$ α,ω-dithiols; $C_1$ to $C_{20}$ branched molecules having two or more terminal thio groups; 2-mercaptoethyl sulfide; triethylene glycol dimercaptan and similar polyglycol dimercaptans and similar di-olefin dimercaptans; ethylcyclohexyl dimercaptan; commercially available dimercaptans as described in the specification; ortho-, meta- and para-benzene dithiol; ortho-, meta- and para-benzene dimethane dithiol [o-, m- and p-$(HSCH_2)_2C_6H_4$]; pentaerythrityl thiol; 4,4'-thiobisbenzene thiol; thiol terminated polyethers; thiol terminated polythioethers; thiol terminated polyurethanes; and similar multifunctional thiols known in the art.

* * * * *

UNITED STATES PATENT AND TRADEMARK OFFICE
CERTIFICATE OF CORRECTION

PATENT NO.   : 6,818,680 B2
DATED        : November 16, 2004
INVENTOR(S)  : Paul J. Shustack It is certified that error appears in the above-identified patent and that said Letters Patent is hereby corrected as shown below:

<u>Column 18,</u>
Line 51, "general formula R—$(SH)_m$" should read -- general formula R—$(SH)_n$ --

<u>Column 19,</u>
Line 60, "and a reactive" should read -- and a refractive --

<u>Column 21,</u>
Line 37, "MOM" should read -- more --

Signed and Sealed this

Third Day of May, 2005

JON W. DUDAS
*Director of the United States Patent and Trademark Office*